May 24, 1927.

H. A. BENEDICT ET AL 1,629,904

PASSENGER VEHICLE

Filed July 10, 1925

INVENTORS
Herschel A. Benedict
Edward M. Moller
BY
King + Schlatt
ATTORNEYS

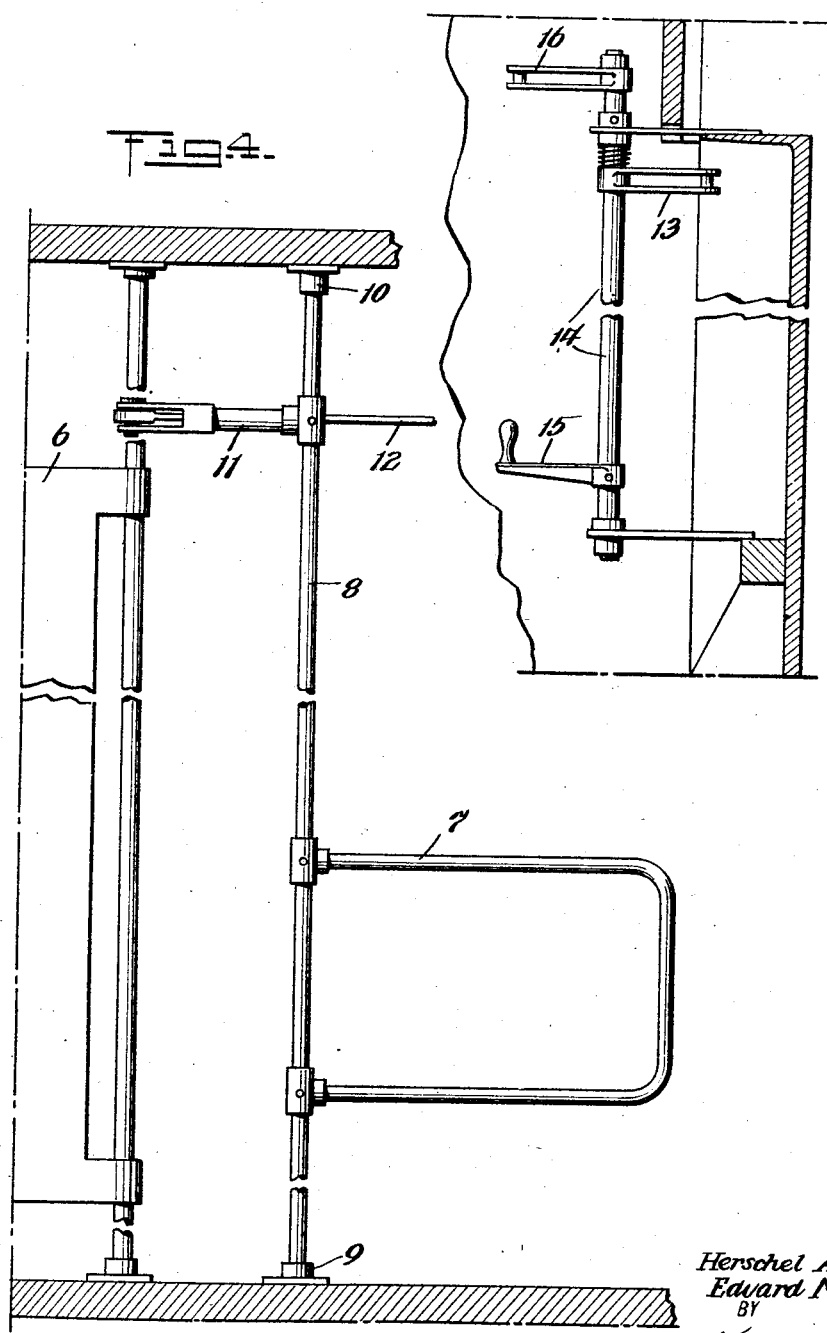

Patented May 24, 1927.

1,629,904

UNITED STATES PATENT OFFICE.

HERSCHEL A. BENEDICT, OF EAST ORANGE, AND EDVARD M. MOLLER, OF SOUTH ORANGE, NEW JERSEY.

PASSENGER VEHICLE.

Application filed July 10, 1925. Serial No. 42,698.

This invention relates to improvements in passenger vehicles, and particularly to vehicles such as trolley cars and busses wherein the operator is at the front thereof, the vehicle having an entrance and exit door for passengers at one side thereof opposite the operator's position.

The objects of the invention are to provide means for keeping the operator's view clear; to provide means for keeping the passengers back of the operator's position; to enable the operator to push the passengers back; to provide a swinging gate which closes toward the body of the vehicle; to couple the operation of said gate with the operation of the vehicle door; to open and close said gate and door simultaneously; to secure simplicity of construction and operation, and to obtain other advantages and results as may be brought out in the following description.

Referring to the accompanying drawings in which like numerals of reference indicate similar parts throughout the several views, Figure 1 is a horizontal sectional view of the forward portion of a vehicle embodying our invention;

Figure 3 is an elevation of the control means, and

Figure 4 is an elevation of the gate.

Figure 1:
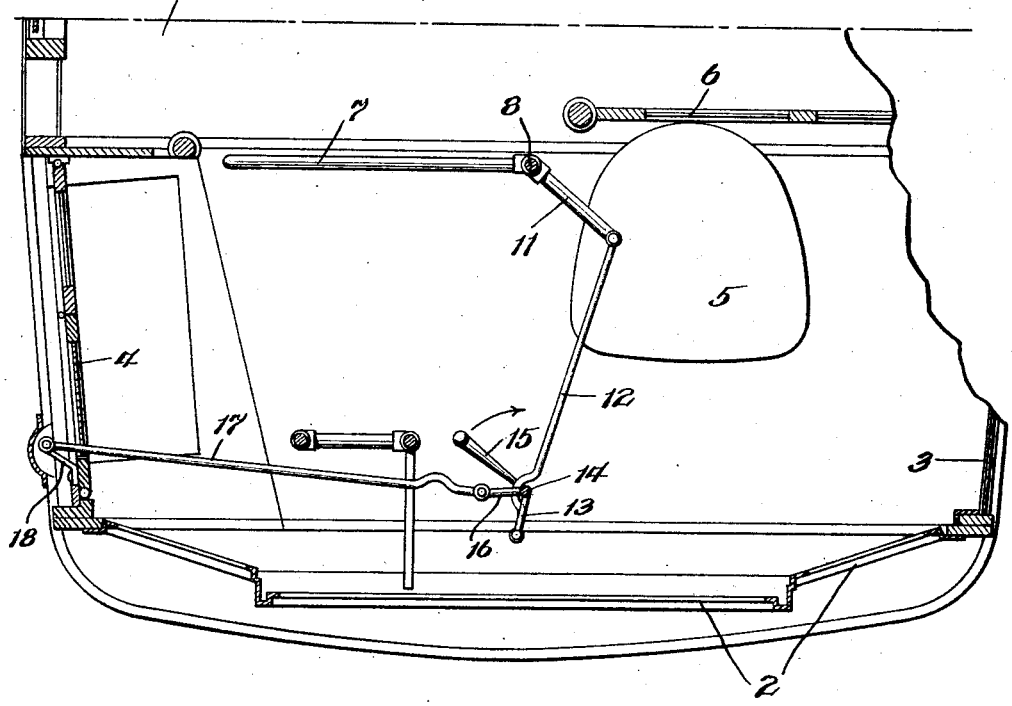
Figure 2:
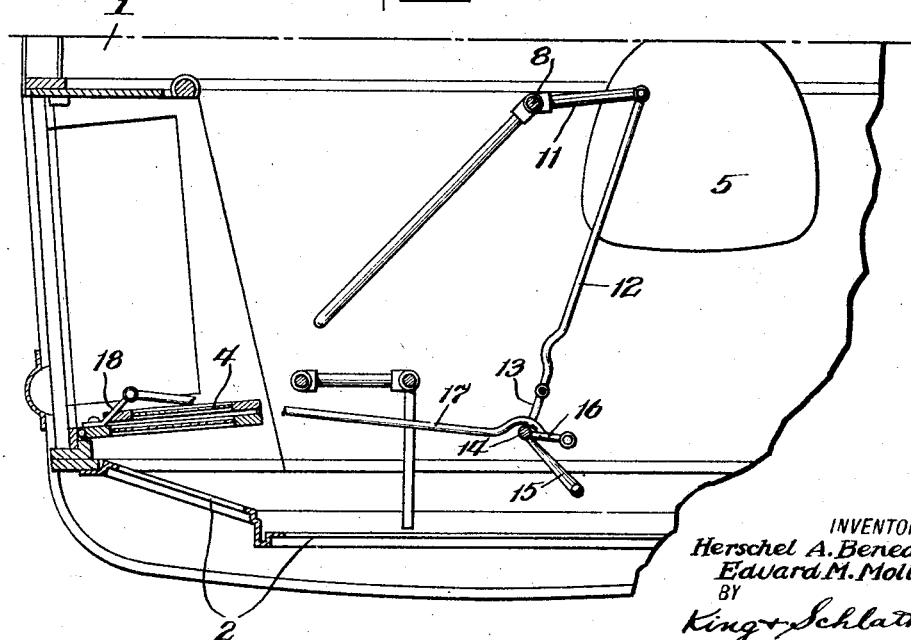
Figure 2 is a similar view showing movable parts in a different position.

In the specific embodiment of the invention illustrated in said drawings, the reference numeral 1 indicates in general the vehicle which may be any passenger carrying vehicle but which, for purposes of present disclosure is shown to be a bus or motor vehicle. As part of the vehicle structure the same is shown as providing a bay with front windows 2, a left side window 3 and glass folding door 4 at the right. Within this bay is positioned an operator's seat 5 from which the operator may see to the front or either side. It has been found in practice, however, that passengers boarding the vehicle have a tendency to linger near the front door, and not infrequently interfere with the operator and obstruct his view. It is therefore deemed advisable, if not necessary, to segregate the operator from the passengers, and to do so by preventing passengers from remaining within the bay.

In carrying out our invention, we provide a partition 6 at the rear of the operator's seat, and in conjunction with said partition provide a gate 7 for the aisle. The partition and gate completely divide off the body of the vehicle from the driver's compartment or bay, when the gate is closed.

As shown, the gate 7 is preferably formed with a vertical post 8 rotatable in suitable sockets 9 and 10 shown herein as secured to the floor and ceiling of the vehicle. Near the top of said post is fixed an arm 11 by which the post may be rotated and the gate swung. Said arm 11 is connected by link 12 to a similar arm 13 forming part of a control means. Said means preferably comprises a vertical rotatable rod 14 with laterally projecting handle 15 near its bottom by which the operator may rotate said rod. Near the upper end of said rod is fixed the above-mentioned arm 13.

Also fixed on said vertical rod, is another arm 16 connected by a link 17 to a bracket 18 on the vehicle door 4. As said arm 16 is swung, the door will be correspondingly swung to open or close the same, thus permitting entry or departure of passengers. Since the gate and the vehicle door are both operated from the arms on the one rod and by turning of the single handle, they will be operated simultaneously. Furthermore, the parts are so arranged and proportioned to secure an opening of the gate at the same time the door is opened.

Preferably the link 17 to the door and its actuating arm 16 are arranged to pass the straight line position so as to lock the door closed and prevent rotation of the rod until positively actuated. In this position of these parts, the link 12 and arm 13 for the gate are also preferably in interlocking position so that pressure on the gate will not operate to swing the same open. It may here be noted that the gate in swinging open moves toward the front of the vehicle and in closing moves toward the body. As a consequence, the operator may, in closing the gate cause the same to push the passengers back and thus not rely upon their volunteering to move back to enable him to close the gate.

Obviously detail changes and modifications may be made in the manufacture and use of the invention without departing from the spirit and scope thereof, and we do not wish to be understood as limiting ourselves to the exact structure shown and described except as set forth in the following claims when construed in the light of the prior art.

Having thus described our invention, we claim:—

1. In combination with a vehicle having a driver's seat, an entrance door opposite the side of said seat, and a gate hinged adjacent the rear and afore-mentioned side of said seat with the free edge of said gate toward the entrance door, the hinging of said gate enabling the same to swing adjacent the seat so that entering passengers will be in proximity to the driver for collection of fares.

2. In combination with a vehicle having a driver's seat, an entrance door opposite the side of said seat, a gate hinged adjacent the rear and afore-mentioned side of said seat with the free edge of said gate toward the entrance door, the hinging of said gate enabling the same to swing toward the seat and adjacent thereto so that entering passengers will be in proximity to the driver for collection of fares, and means in reach of the driver for swinging said gate away from said seat past said entrance door to a position at the rear of said seat for pushing and holding passengers to the rear of the driver and thereby afford a clear view to the side.

3. In combination with a vehicle having a driver's seat, an entrance door opposite the side of said seat, a gate hinged adjacent the rear and afore-mentioned side of said seat with the free edge of said gate toward the entrance door, the hinging of said gate enabling the same to swing toward the seat and adjacent thereto so that entering passengers will be in proximity to the driver for collection of fares, and means for swinging said gate from said position in proximity to the driver to a position toward the rear of the driver and simultaneously close said entrance door, the space between said entrance door and the free end of the gate being insufficient at all times to permit passage of a person therebetween, thereby enforcing movement of the passengers into the vehicle sufficient to afford a clear view to the side of the driver's seat as the entrance door is closed.

HERSCHEL A. BENEDICT.
EDVARD M. MOLLER.